(12) United States Patent
Goebel et al.

(10) Patent No.: US 10,947,883 B2
(45) Date of Patent: Mar. 16, 2021

(54) METHODS AND SYSTEMS FOR ADJUSTING EXHAUST GAS FLOW THROUGH AN AFTERTREATMENT DEVICE

(71) Applicant: Ford Global Technologies, LLC, Dearborn, MI (US)

(72) Inventors: Felix Goebel, Aachen (DE); Guenter Grosch, Vettweiss (DE); Rainer Lach, Wuerselen (DE); Richard Fritsche, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 16/286,452

(22) Filed: Feb. 26, 2019

(65) Prior Publication Data
US 2019/0277179 A1   Sep. 12, 2019

(30) Foreign Application Priority Data

Mar. 6, 2018 (DE) .......................... 102018203300.5

(51) Int. Cl.
   *F01N 9/00* (2006.01)
   *F01N 11/00* (2006.01)
   *F01N 3/20* (2006.01)
   *F01N 3/10* (2006.01)

(52) U.S. Cl.
   CPC .............. *F01N 9/00* (2013.01); *F01N 3/103* (2013.01); *F01N 3/208* (2013.01); *F01N 11/002* (2013.01)

(58) Field of Classification Search
CPC combination set(s) only.
See application file for complete search history.

(56) References Cited

U.S. PATENT DOCUMENTS

| 7,490,467 | B2 * | 2/2009 | Cummings | F01N 1/088 60/274 |
| 7,510,172 | B2 * | 3/2009 | Kojima | B01D 53/18 261/113 |
| 2006/0162690 | A1 * | 7/2006 | Kim | F01N 13/08 123/306 |
| 2008/0087013 | A1 * | 4/2008 | Crawley | F01N 3/0231 60/320 |
| 2008/0289321 | A1 | 11/2008 | Lu et al. | |
| 2016/0243510 | A1 * | 8/2016 | Denton | B01D 53/9409 |
| 2018/0058294 | A1 * | 3/2018 | Zhang | F01N 3/2892 |
| 2018/0078912 | A1 * | 3/2018 | Yadav | F01N 3/106 |

FOREIGN PATENT DOCUMENTS

| DE | 19740702 C1 | 11/1998 |
| DE | 112008002052 T5 | 6/2010 |
| DE | 102009028998 A1 | 3/2011 |

(Continued)

*Primary Examiner* — Binh Q Tran
(74) *Attorney, Agent, or Firm* — Geoffrey Brumbaugh; McCoy Russell LLP

(57) ABSTRACT

Methods and systems are provided for a flow device shaped to adjust flow to radial positions of an emission control device. In one example, a system may include where the flow device comprises a plurality of inner openings that align while a plurality of outer openings are misaligned to flow exhaust gas proximal to a central axis of an exhaust passage, and where the plurality of outer openings are aligned and the plurality of inner openings are misaligned to flow exhaust gas distal to the central axis.

19 Claims, 9 Drawing Sheets

(56) References Cited

FOREIGN PATENT DOCUMENTS

| | | |
|---|---|---|
| DE | 102011003019 A1 | 7/2012 |
| DE | 102015219028 A1 | 4/2017 |
| DE | 102016222010 A1 | 6/2017 |
| DE | 102016223558 A1 | 6/2017 |
| EP | 2131019 A1 | 12/2009 |
| FR | 2944555 A1 | 10/2010 |
| WO | 03050398 A1 | 6/2003 |

\* cited by examiner

METHODS AND SYSTEMS FOR ADJUSTING EXHAUST GAS FLOW THROUGH AN AFTERTREATMENT DEVICE

CROSS REFERENCE TO RELATED APPLICATION

This application claims priority to German Patent Application No. 102018203300.5, filed Mar. 6, 2018. The entire contents of the above-listed application are hereby incorporated by reference for all purposes.

Field

The present description relates generally to methods and systems for an arrangement for exhaust gas aftertreatment in a combustion engine in which the exhaust gas can be selectively passed through a nitrogen oxide storage catalytic converter or an oxidation catalytic converter depending engine operating conditions.

BACKGROUND/SUMMARY

With a view to comply with current and future emission requirements for combustion engines, high demands are placed on the exhaust gas aftertreatment. In this case, efficient operation of corresponding devices for exhaust gas aftertreatment over the entire operating range of a combustion engine is desired. Known methods for catalytically assisted exhaust gas cleaning operate efficiently under different boundary conditions. As such, it may be desired to incorporate one or more different catalysts in an exhaust gas aftertreatment arrangement to treat exhaust gas pollutants for a greater engine operating range.

To remove oxides of nitrogen from the exhaust gas, nitrogen oxide storage catalytic converters (also known as NOx storage catalytic converters or lean NOx traps, LNT) and/or catalytic converters are used for selective catalytic reduction (SCR). LNTs may be used for adsorption of oxides of nitrogen from the exhaust gas of combustion engines. In addition, they may perform oxidative aftertreatment of carbon monoxide (CO) and hydrocarbons (HC). Nitrogen oxide arising in the lean mode of a combustion engine can be stored in an LNT. The LNT may oxidize the nitrogen monoxide (NO) contained in the lean exhaust gas to form nitrogen dioxide ($NO_2$) and then stores it in the form of nitrates. Adsorbents that are used in the coating of the LNT may be barium oxide and/or other oxides, for example.

If the storage capacity of an LNT is used up (e.g., the LNT is fully loaded and unable to adsorb more nitrogen dioxide, it may be desired to regenerate the LNT. In the case of a regeneration event (purge), substoichiometric exhaust conditions are provided, for example by operating the combustion engine with a rich fuel-air-mixture (e.g., $\lambda<1$). In such an example, the stored nitrogen oxides are desorbed again and reduced to nitrogen at catalytically active components of the LNT using the constituents in the rich exhaust gas (CO, HC). In addition to a rich engine operation that is initiated for regeneration, the LNT is of course also regenerated if the exhaust gas is substoichiometric, for example because of a driver demand of the combustion engine. For reducing desorbed oxides of nitrogen that are not reduced in the LNT, a catalytic converter that is disposed downstream can be provided for selective catalytic reduction (SCR).

In a catalytic converter for selective catalytic reduction (SCR), nitrogen oxide is reduced to gaseous nitrogen and water using a reducing agent, (e.g., ammonia). For this, ammonia can be introduced into the exhaust system upstream of the SCR in the form of an aqueous urea solution (for example AdBlue®), which is hydrolyzed into ammonia and carbon dioxide. Ammonia can also be introduced in gaseous form into the exhaust system or can arise in the case of regeneration of an LNT and can pass into a SCR that is disposed downstream. In all cases, ammonia may be stored in the SCR to reduce nitrogen oxide to nitrogen under lean exhaust conditions.

The temperature window providing desired efficiency of an LNT lies in a range of 150 to 500° C., and that of an SCR in a range of 200 to 500° C. An LNT operates particularly well in this case in a low temperature window in low to medium load states of the combustion engine. Said operating mode occurs particularly often when using a motor vehicle in an urban environment, where exhaust gas temperatures are low (e.g., less than 200° C.).

An effective and hence purposeful manner of operation of a SCR catalytic converter exists at exhaust gas temperatures above 200° C. The use of an SCR is therefore desired at high-load, emission-intensive operating points of the combustion engine because of the high conversion efficiency thereof. Said operating mode is particularly frequently to be found when using a motor vehicle outside an urban environment (e.g., highway driving).

A further component for catalytic exhaust gas aftertreatment is an oxidation catalytic converter. Said components are used to remove (e.g. oxidize) carbon monoxide and hydrocarbons from the exhaust gas of combustion engines, particularly of self-igniting combustion engines. In this case, carbon monoxide is oxidized to carbon dioxide and hydrocarbons are oxidized to carbon dioxide and water. The reduction of oxides of nitrogen is not favored in an oxidation catalytic converter. Oxides of nitrogen are therefore reduced in an LNT and/or in a SCR.

However, an LNT has the property of adversely altering a ratio of nitrogen dioxide to nitrogen monoxide from 50:50, which is advantageous for the operation of a SCR, to a high nitrogen monoxide component (e.g., a ratio of 1:2 or lower). It is therefore desirable to adjust the flow of exhaust gas so that the LNT is not used at certain temperatures, wherein the certain temperatures coincide with efficient operating temperatures. It is thus an object to improve the exhaust gas aftertreatment in relation to the reduction of oxides of nitrogen.

In one example, the issues described above may be addressed by a system comprises a flow device shaped to flow exhaust gas to an outer region or an inner region of an emission control device, wherein the flow device comprises a rotatable first plate and a fixed second plate, each of the first plate and the second plate comprising inner and outer openings, wherein an alignment of the inner and outer openings is adjusted via a rotation of the first plate. In this way, exhaust gas flow through the emission control device may be adjusted based on an estimated efficiency of the different regions of the emission control device based on engine operating conditions.

In one example, the present disclosure comprises an arrangement of a combustion engine with an exhaust system in which at least one oxidation catalytic converter and at least one first nitrogen oxide storage catalytic converter are disposed in a common first catalytic converter device, downstream of which at least one first catalytic converter for selective catalytic reduction and at least one particle filter are disposed, and at least one delivery device for a reducing agent is disposed upstream of the catalytic converter for selective catalytic reduction, in which the first catalytic converter device comprises an outer region and an inner region, and in which a switching device for controlling the flow of exhaust gas is disposed at the upstream end and is embodied to pass exhaust gas through the inner region in a first working mode and to pass exhaust gas through the outer region in a second working mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale, although other relative dimensions may be used, if desired.

DETAILED DESCRIPTION

Figure 1:
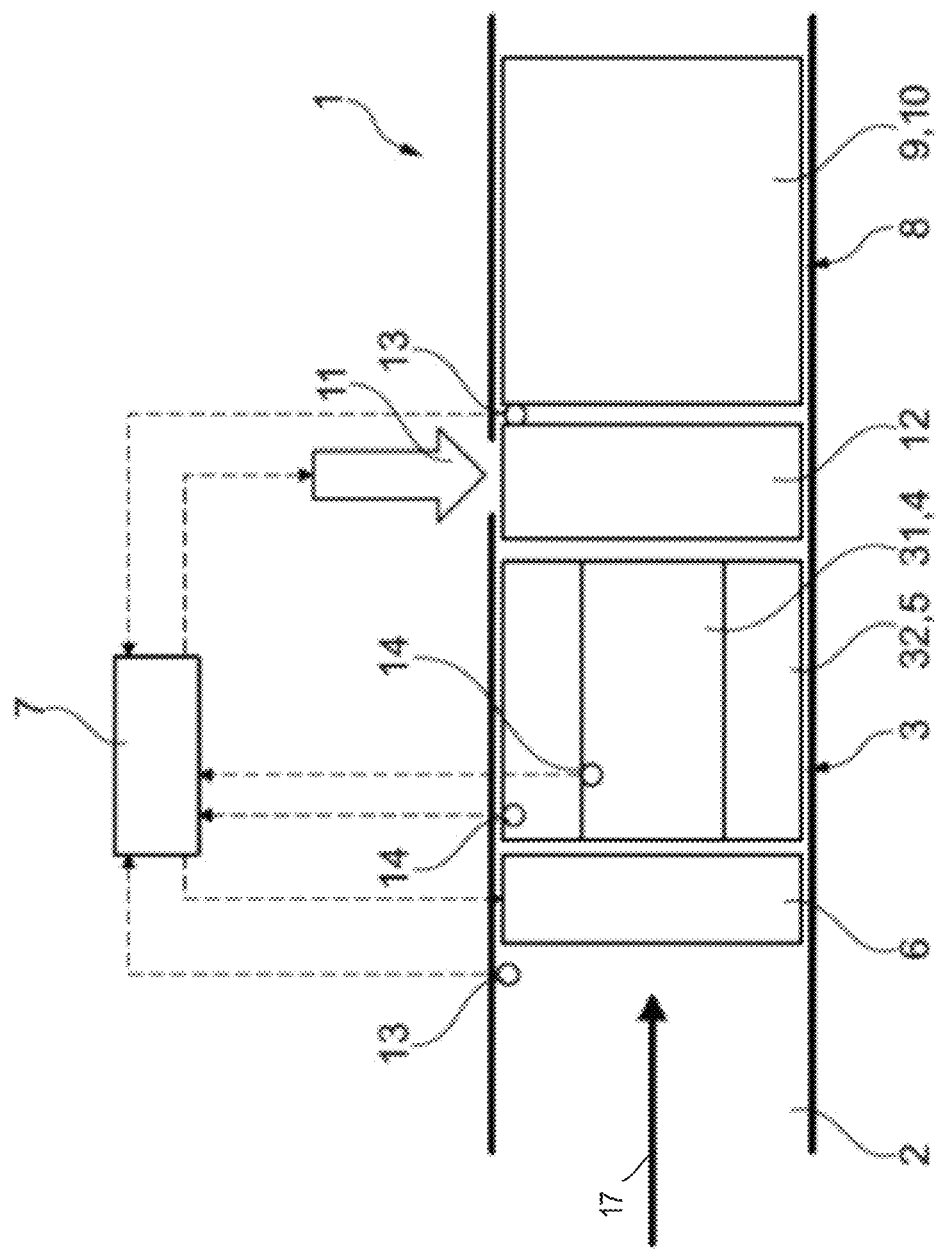
FIG. 1 shows a schematic representation of an embodiment of the arrangement according to the disclosure.
Figure 2:
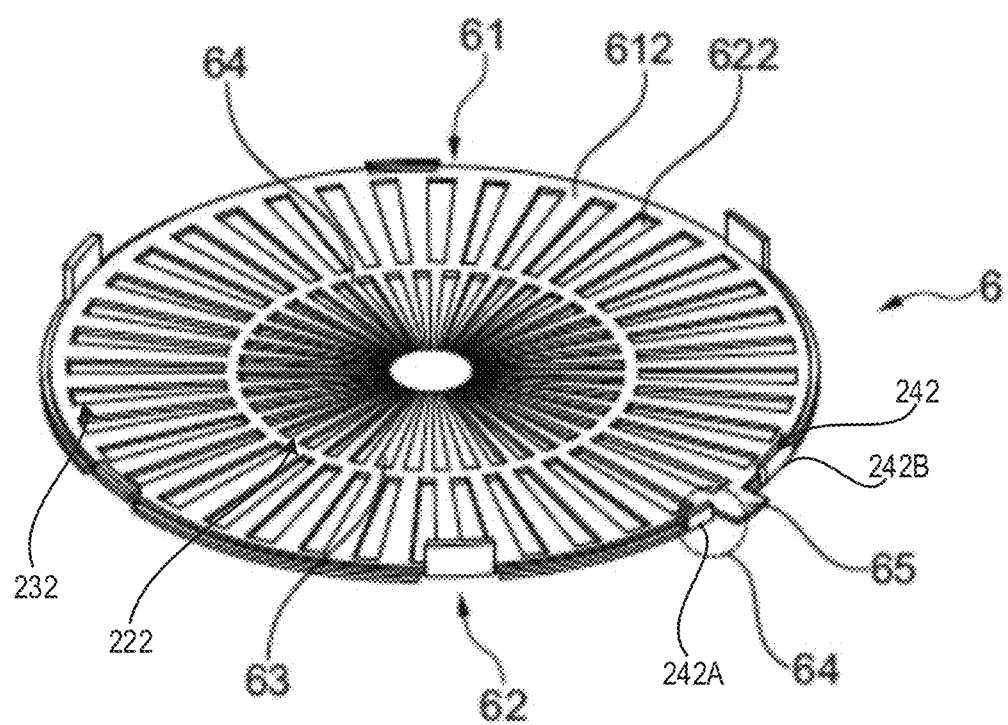
FIG. 2 shows an embodiment of a switching device in the arrangement according to FIG. 1 in a first working mode.
Figure 3:
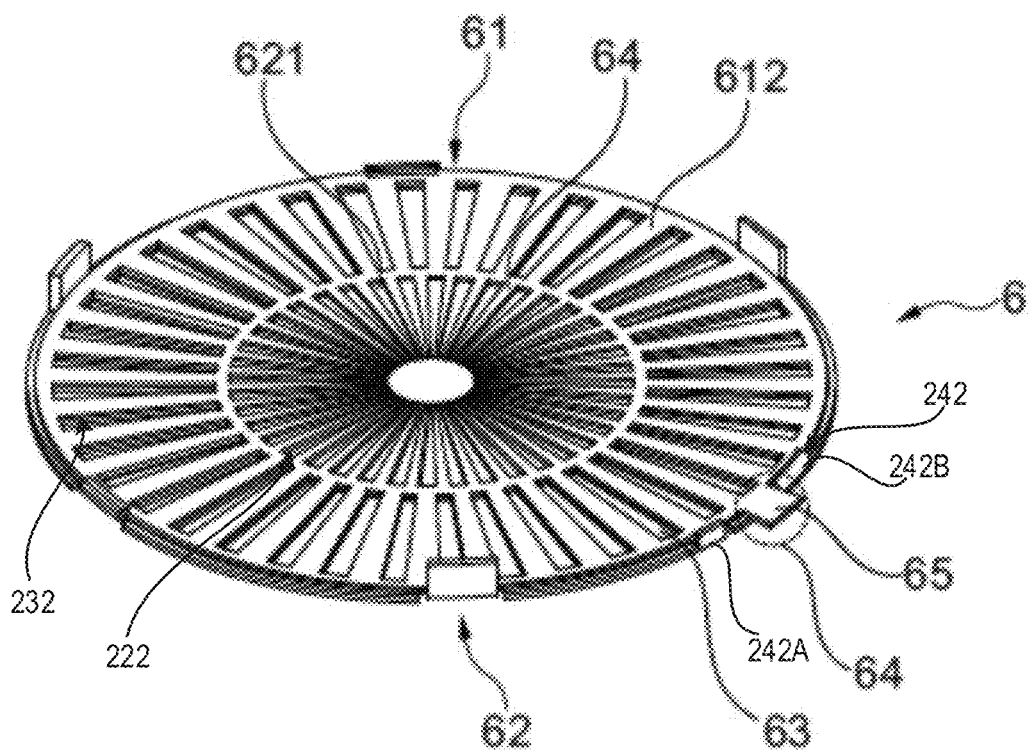
FIG. 3 shows the switching device according to FIG. 2 in a second working mode.
Figure 4:
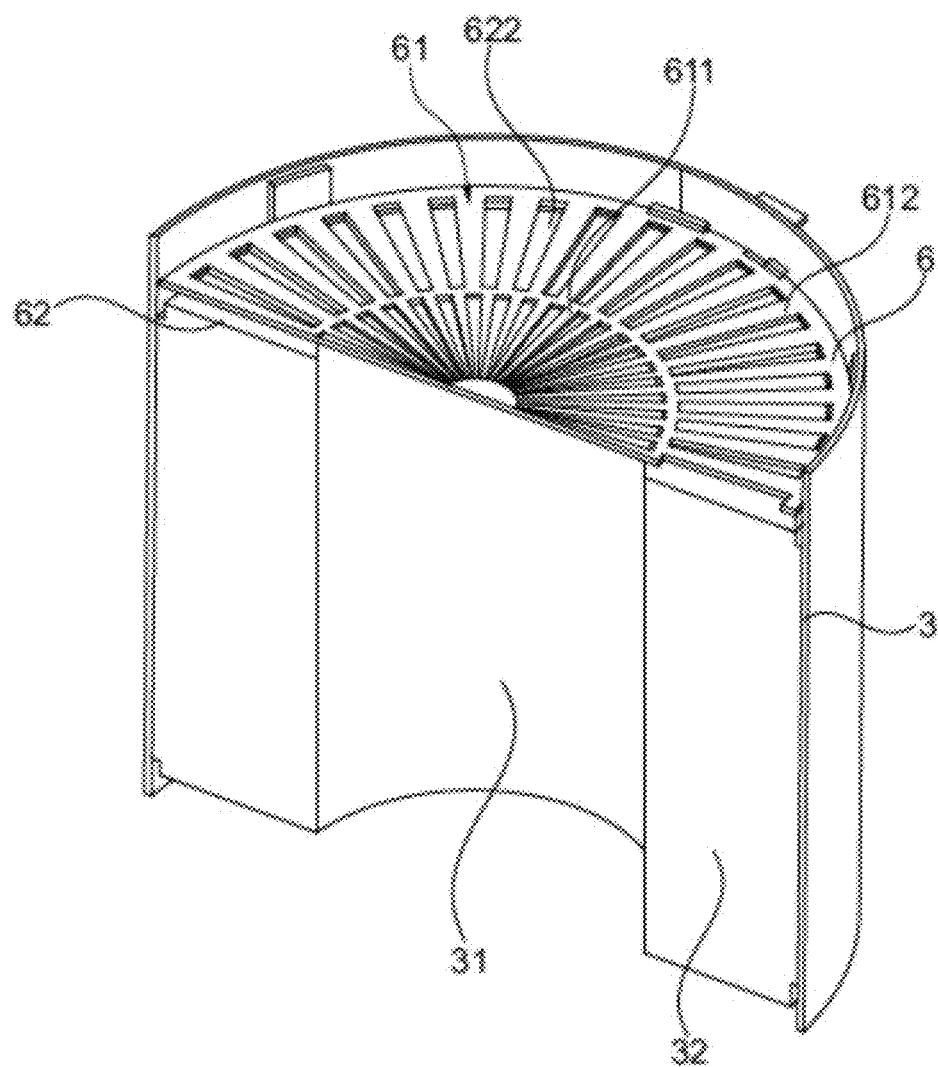
FIG. 4 shows the switching device according to FIGS. 2 and 3 with a first catalytic converter device of the arrangement according to FIG. 1
Figure 5:
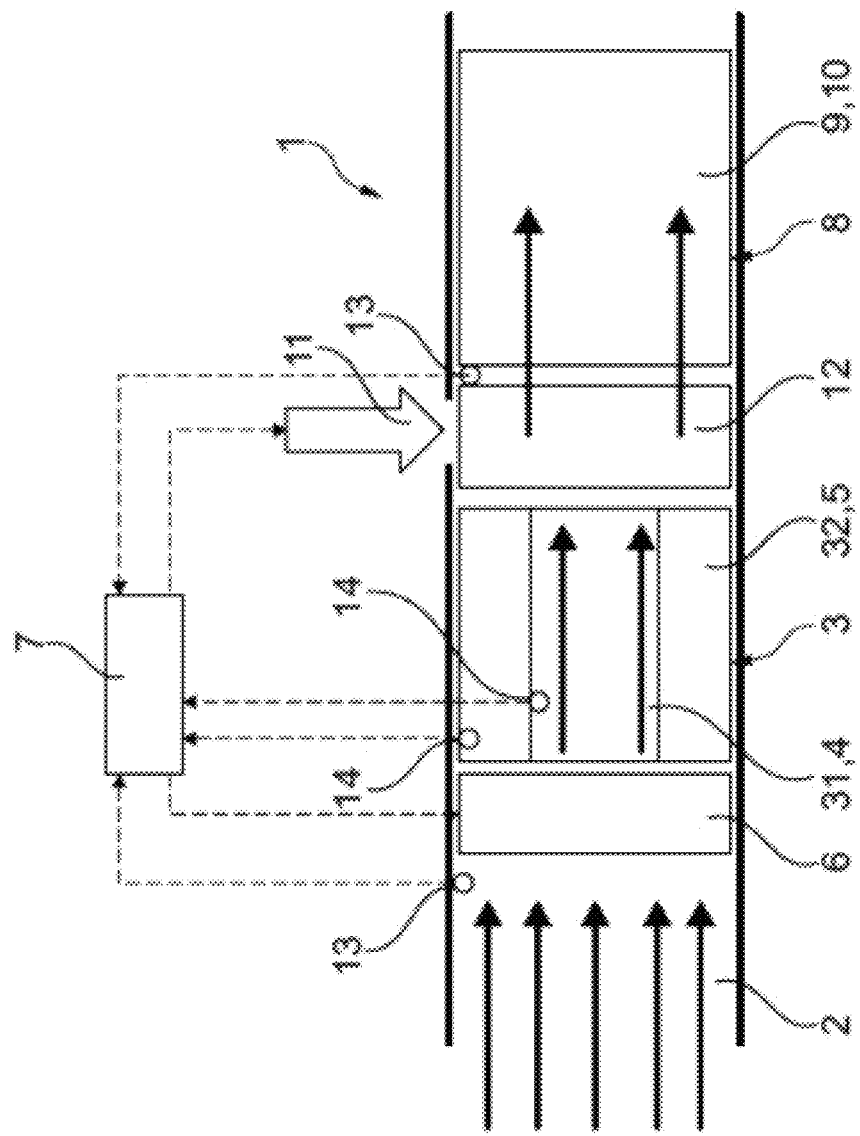
FIG. 5 shows the arrangement according to FIG. 1 in a first working mode.
Figure 6:
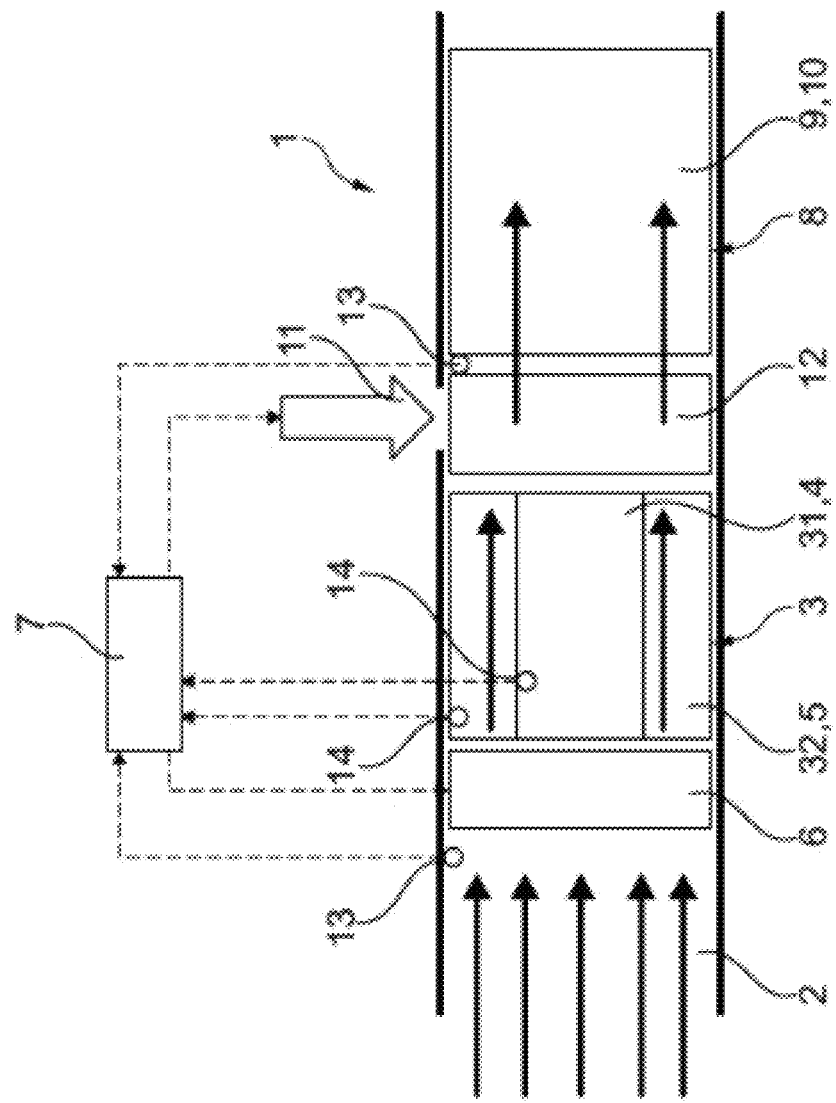
FIG. 6 shows the arrangement according to FIG. 1 in a second working mode.
Figure 7:
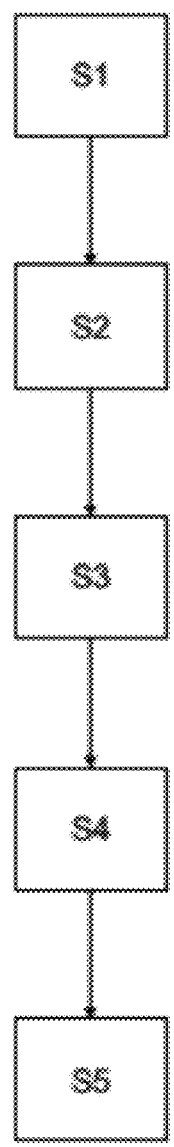
FIG. 7 shows a flow chart of an embodiment of the method according to the disclosure.
Figure 8:
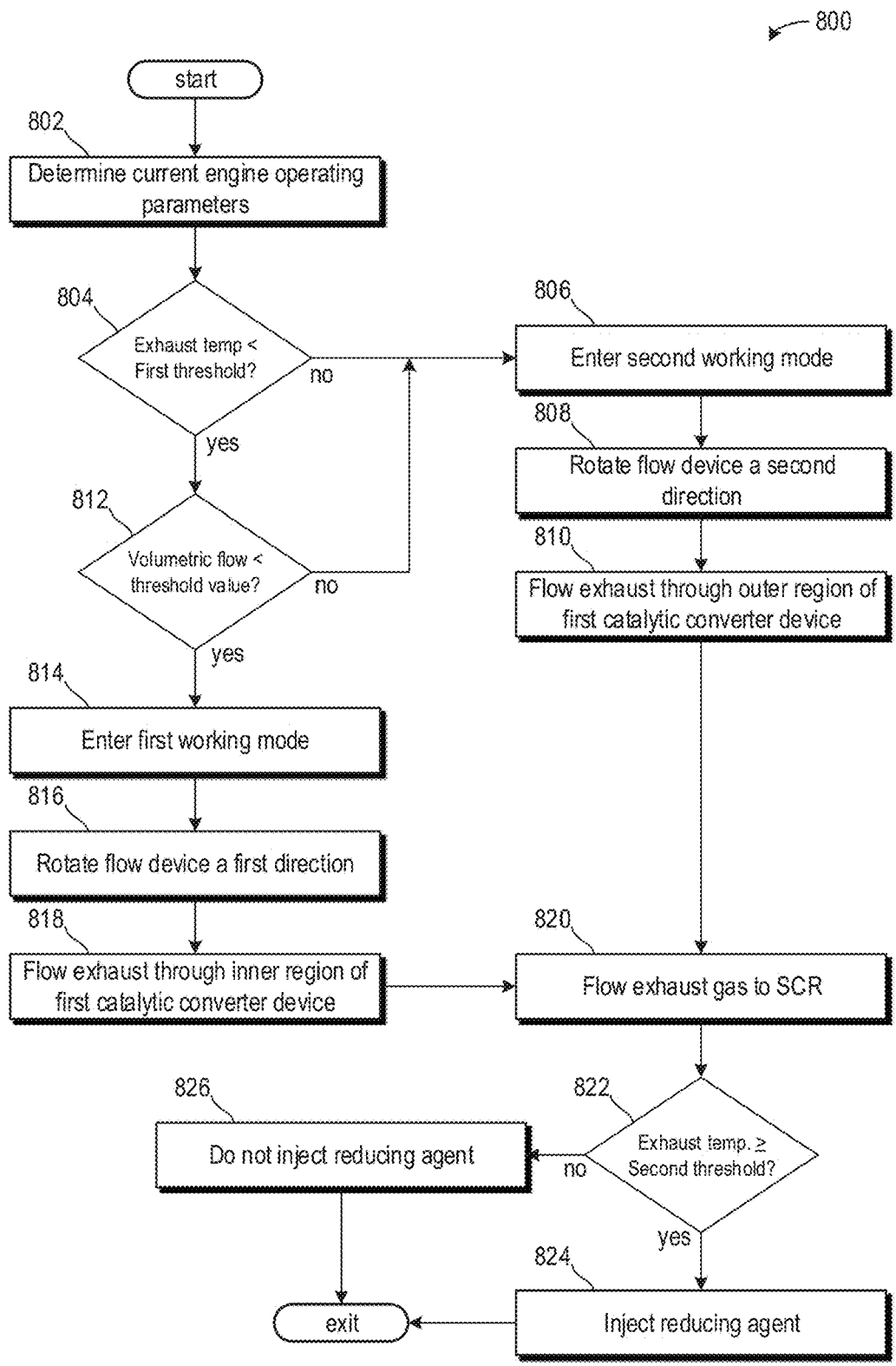
FIG. 8 shows a working mode diagram of an embodiment of the method according to the disclosure.
Figure 9:
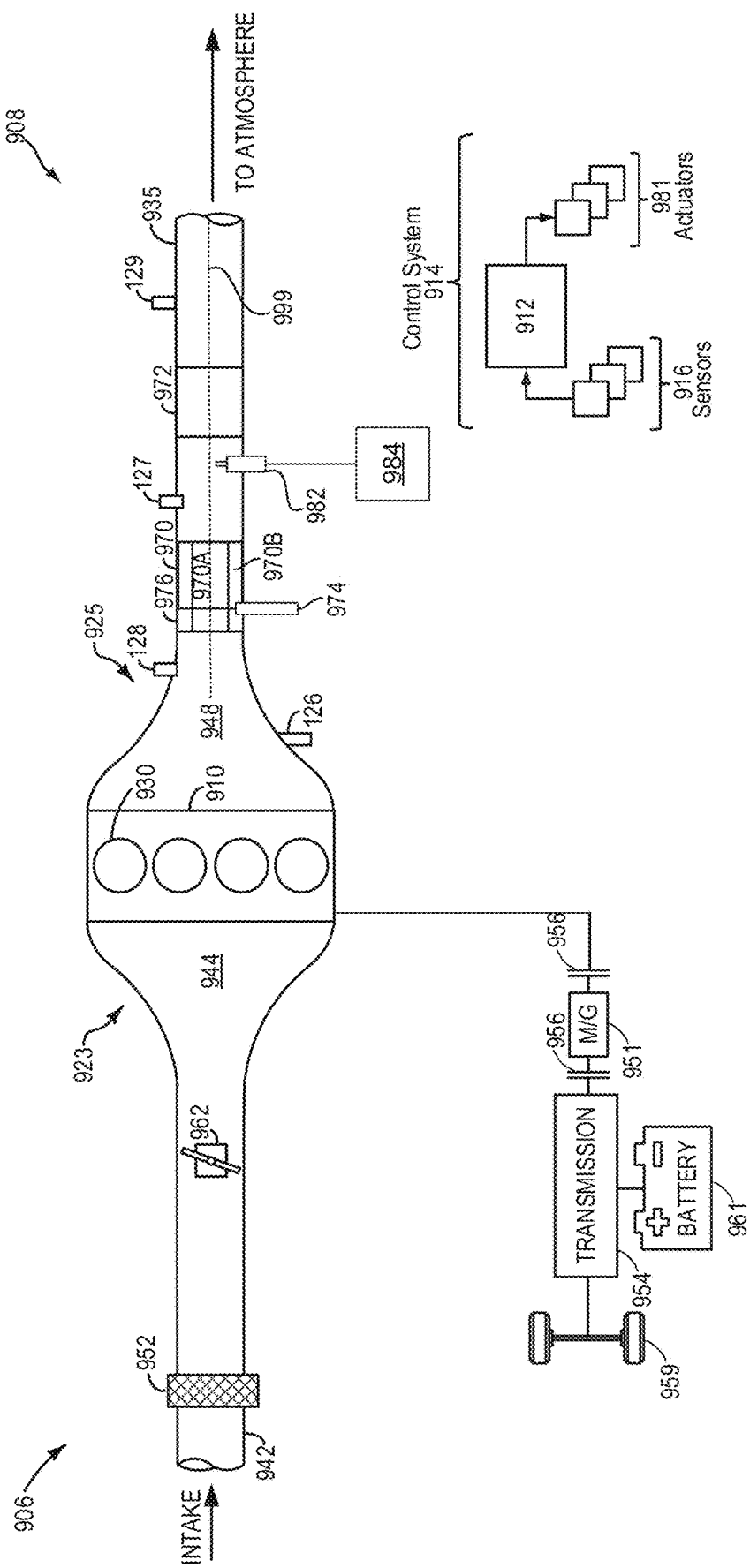
FIG. 9 shows a schematic of an engine in a hybrid vehicle.
Figure 10:
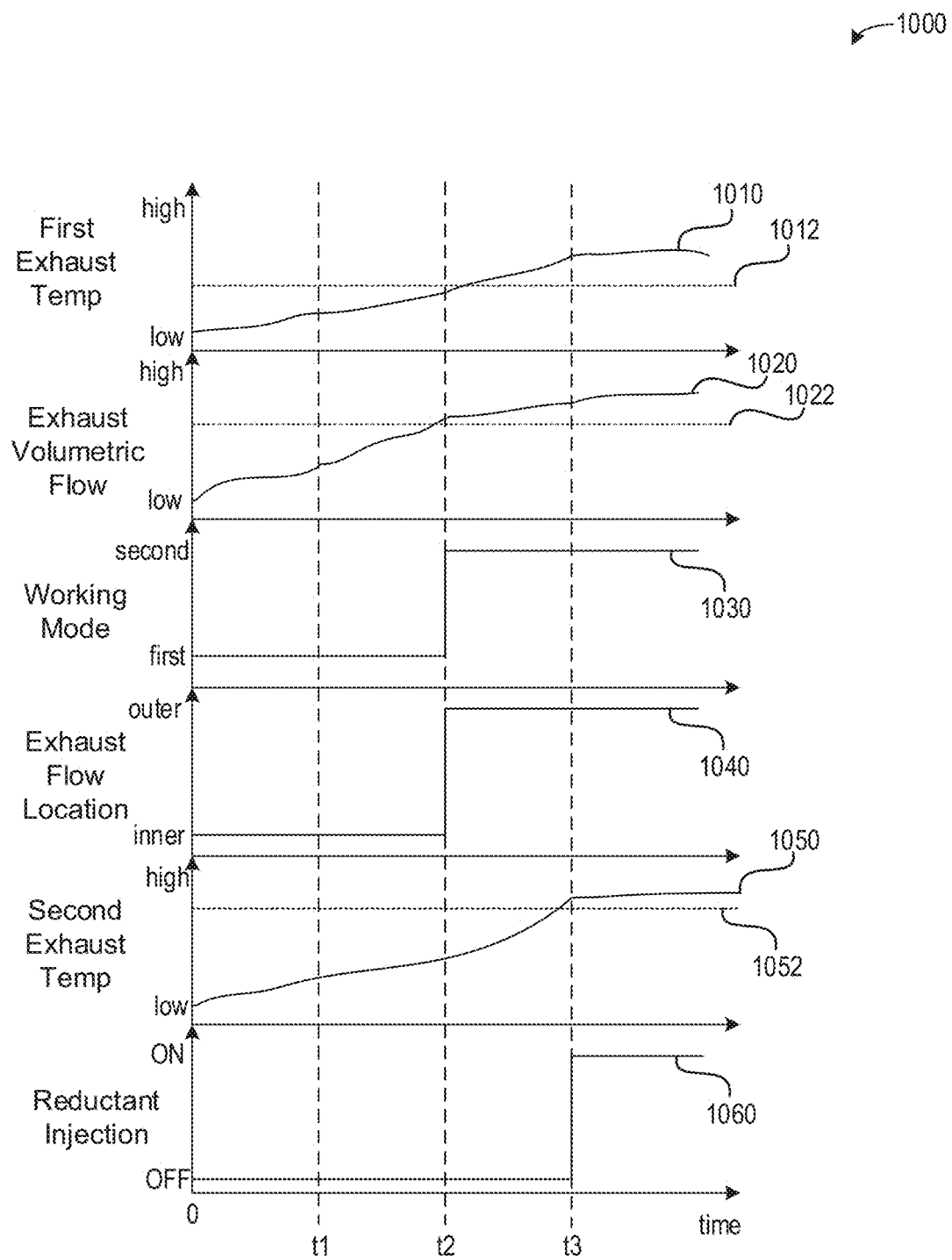
FIG. 10 shows a prophetic engine operating sequence illustrating adjustments to vehicle operating parameters and the switching device.

The following description relates to systems and methods for a flow device and/or a switchable component shaped to adjust exhaust gas flow to radially different positions of an emission control device. FIG. 1 shows a schematic representation of an embodiment of the arrangement according to the disclosure. FIG. 2 shows an embodiment of a switching device in the arrangement according to FIG. 1 in a first working mode. FIG. 3 shows the switching device according to FIG. 2 in a second working mode. FIG. 4 shows the switching device according to FIGS. 2 and 3 with a first catalytic converter device of the arrangement according to FIG. 1. FIG. 5 shows the arrangement according to FIG. 1 in a first working mode. FIG. 6 shows the arrangement according to FIG. 1 in a second working mode. FIG. 7 shows a flow chart of an embodiment of the method according to the disclosure. FIG. 8 shows a working mode diagram of an embodiment of the method according to the disclosure. FIG. 9 shows a schematic of an engine in a hybrid vehicle. FIG. 10 shows a prophetic engine operating sequence illustrating adjustments to vehicle operating parameters and the switching device.

The arrangement according to the disclosure at least partially solves the issues described above by equipping the exhaust gas aftertreatment in the exhaust system with a switchable component. The switchable component may be interchangeably referred to herein as a flow device. This enables the flow of exhaust gas to be regulated with a suitable control strategy. It is advantageously enabled to deliver the flow of exhaust gas depending on functionally relevant operating parameters to maximize the cleaning efficiency of the system for the different components according to the performance attributes thereof.

In one example, the combustion engine is a self-igniting combustion engine (e.g., a diesel engine). The particle filter is consequently a diesel particle filter. However, it will be appreciated that the switchable component of the exhaust system may be implemented in an exhaust system of a spark-ignited engine without departing from the scope of the present disclosure. It will be appreciated by those of ordinary skill in the art that temperature thresholds and the like described below may be adjusted for arranging the switchable device in the exhaust system of the spark-ignited engine due to hotter exhaust gas temperatures therein compared to diesel exhaust systems.

The switching device is shaped to pass the flow of exhaust gas selectively through the outer region and/or the inner region of the first catalytic converter device. For this purpose, the switching device comprises openings for allowing passage of the exhaust gas, which are correspondingly at least partly opened and closed.

In the arrangement, the oxidation catalytic converter is preferably disposed in the outer region of the first catalytic converter device. The outer position of the oxidation catalytic converter is advantageous because good thermal coupling with the environment is realized. As a result, overheating of the exhaust has aftertreatment components can be avoided.

In the arrangement, the nitrogen oxide storage catalytic converter is preferably disposed in the inner region of the first catalytic converter device. The inner position of the LNT is desired since increased thermal isolation relative to the outer region is realized. As a result, temperature losses are minimized, and the catalytic converter can be operated with optimum efficiency in a typical temperature window (150-350° C.). Said another way, the inner region may be hotter than the outer region, as the outer region may be in face-sharing contact with a surface of an exhaust pipe, wherein thermal communication with the exhaust pipe may allow cooler temperatures of a surrounding environment (e.g., an ambient atmosphere) decrease a temperature of the outer region, while a temperature of the inner region remains relatively constant.

In the arrangement according to the disclosure, the catalytic converter for selective catalytic reduction and the particle filter may be arranged in a second catalytic converter device. In this case, said devices can also be combined with each other, (e.g., the particle filter can comprise a coating acting as an SCR). The integration of the filter and SCR may enable an arrangement close to the combustion engine, which has a favorable effect on the operation as higher temperatures of the second catalytic converter device may be achieved. Furthermore, the combination is space-saving and may decrease packaging constraints.

It is desirable that the distribution of introduced reducing agent is carried out uniformly over the filter in a particle filter with an SCR coating, so that the SCR function can be used over the whole filter region. Therefore, a mixer for fluid media may be disposed in the arrangement in the exhaust system upstream of the catalytic converter for selective catalytic reduction.

The oxidation catalytic converter is preferably optimized for a high conversion efficiency of nitrogen monoxide to nitrogen dioxide. Thus, the ratio of nitrogen monoxide to nitrogen dioxide is advantageously adjusted to 50:50, which may increase the conversion efficiency of the SCR.

A further embodiment of the disclosure concerns a motor vehicle with an arrangement according to the disclosure.

An additional embodiment of the disclosure concerns a method for controlling exhaust gas aftertreatment with an arrangement according to the disclosure. The method comprising operating the combustion engine, determining a first exhaust gas temperature in a region upstream of the first catalytic converter device, switching the switching device into the first working mode if the first exhaust gas temperature is less than or equal to a first threshold value for the temperature and into the second working mode if the first exhaust gas temperature is greater than the first threshold value, determining the velocity of the exhaust gas in the vicinity of the first catalytic converter device, leaving the switching device in the first working mode if the velocity is less than or equal to a threshold value for the velocity and switching into the second working mode if the velocity is greater than said threshold value.

Furthermore, the switching of the switching device into the second working mode may be desired since the SCR can be used efficiently for the reduction of oxides of nitrogen at high temperatures and with a high velocity of the exhaust gas. This may be desired at high-load operating points of the combustion engine. Thus, the first working mode may direct exhaust gases to a first portion of the first catalytic converter configured to treat nitrogen oxides. The second working mode may direct exhaust gases to a second portion of the first catalytic converter configured to treat hydrocarbons and exhaust gas constituents other than nitrogen oxides. As such, conditions for the second working mode may be such that nitrogen oxide conversion may be more favorable at the SCR (e.g., the second catalytic converter) than the first portion of the first catalytic converter.

For determining the temperature and velocity of the exhaust gas, sensors are disposed in the exhaust system, for example. The parameters mentioned can alternatively or additionally also be determined based on a model.

A second exhaust gas temperature in the vicinity of the SCR may be sensed via a sensor and reducing agent is introduced into the exhaust system via the delivery device if the second exhaust gas temperature is greater than or equal to a second threshold value for the temperature, and no reducing agent is introduced into the exhaust system if the second exhaust gas temperature lies below a second threshold value for the temperature. In this case, particularly at high temperatures from the second threshold value, reducing agent is introduced because ammonia previously stored in the SCR, which for example was formed during a regeneration in the LNT and was passed into the SCR, escapes from the SCR at high temperatures by slippage and may not be sufficiently available for the reduction of oxides of nitrogen.

Furthermore, a ratio of nitrogen dioxide to nitrogen monoxide of 50% may be desired when the switching device is switched into the second working mode. A split of 50% nitrogen dioxide to nitrogen monoxide may increase a reduction efficiency in the SCR, particularly in connection with ammonia. In this case, the use of an oxidation catalytic converter may be desired since an oxidation catalytic converter is embodied to at least partly oxidize nitrogen monoxide into nitrogen dioxide in addition to converting carbon monoxide and hydrocarbons. The ratio of the nitrogen oxide can be influenced by a corresponding optimization of the oxidation catalytic converter that is clear to the person skilled in the art.

Furthermore, in the method the switching device is additionally switched into the first or second working mode depending on the operating point of the combustion engine. At a high-load operating point, at which relatively hot exhaust gas is produced, the second working mode is advantageous since the exhaust gas is then passed via the oxidation catalytic converter to the SCR, which operates more efficiently at higher temperatures than an LNT. In addition, the LNT is not loaded by high temperatures. A temperature window of 250-500° C. may be desired for the operation of the SCR and is preferably maintained for efficient operation of the SCR. At a low-load operating point, at which relatively cooler exhaust gas is produced, the first working mode is advantageous since the lower operating temperature of the LNT (150-350° C.) can thus be used for efficient exhaust gas aftertreatment. In this case, the LNT can store the nitrogen oxide in addition to converting carbon monoxide and hydrocarbons. The ammonia arising during the cyclical regeneration of the LNT can be stored by the downstream SCR (or the SCR-coated particle filter) and used for a later nitrogen oxide reduction at higher temperatures.

Furthermore, in the method the switching device is additionally switched into the first or second working mode depending on a combination of different parameters in the sense of a 3D-mapping in the control of the combustion engine. As a result, further parameters can be advantageously incorporated into the control of the exhaust gas aftertreatment.

FIGS. 1-6 and 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 5-6 show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

Turning now to FIG. 1, an embodiment of an arrangement 1 according to the disclosure for exhaust gas aftertreatment is represented. In the arrangement 1, an exhaust system 2 is shown that is used to pass exhaust gas of a combustion engine. The combustion engine may be a self-igniting combustion engine. In this case, the arrangement can alternatively also be used for the exhaust gas of an externally ignited combustion engine. The arrow 17 indicates the direction of flow of the exhaust gas in the exhaust system 2.

A first catalytic converter device 3 is disposed in the exhaust system 2. The first catalytic converter device 3 comprises a first (inner) region 31 and a second (outer) region 32. A nitrogen oxide storage catalytic converter 4 (LNT) is disposed in the first region 31 and a diesel oxidation catalytic converter 5 (DOX or DOC) is disposed in the second region 32.

A volume of the first region 31 may be substantially equal to a volume of the second region 32. Additionally or alternatively, the volume of the first region 31 may be greater than or less than the volume of the second region 32. The second region 32 is radially outside of the first region 31, wherein the second region 32 and the first region 31 are concentric about a central axis of an exhaust passage of the exhaust system 2. As such, the second region 32 may be pressed against surfaces of an exhaust pipe shaping the exhaust passage, thereby at least partially insulating the first region 31 from the exhaust pipe and an environment directly outside the pipe, such as an ambient atmosphere.

A switching device 6 is disposed upstream of the first catalytic converter device 3. The switching device 6 is embodied to selectively pass the flow of exhaust gas through the second region 32 and/or the first region 31 of the first catalytic converter device 3. For this purpose, the switching device 6 comprises switchable openings for passing the flow of exhaust gas, which can be correspondingly at least partly opened and closed.

One embodiment of the switching device 6 comprises a first plate 61 and a second plate 62 (FIGS. 2-4). The plates may be round, corresponding to the shape of the first catalytic converter device 3. However, the shape of the plates may be square, triangular, or other shape depending on a shape of the first catalytic converter device 3 and the exhaust system 2. Said plates each comprise an inner region (611 or 621) and an outer region (612 or 622), in each of which a number of openings 63 that are uniformly spaced apart are formed. The openings are embodied and disposed so that the mutually corresponding openings 63 of the inner regions 611, 621 or the outer regions 612, 622 can be aligned with each other in a certain position of the plates 61 and 62.

A certain distance in the peripheral direction is provided between the openings 63 in each case, the size of which is such that in a certain position of the plates 61 and 62 relative to each other in a region, the openings 63 of the one valve plate can be covered by the material of the other valve plate. In the first plate 61, the openings 63 of the inner region 611 are disposed offset relative to the openings 63 of the outer region 612. The openings 63 of the inner region 621 and the outer region 622 of the second plate 62 are not disposed offset relative to one another. The rotary movement of the plates relative to each other is caused by an actuator 64, which is connected to one of the plates via an adapter 65. The movement of the plates relative to each other is controlled by a control device 7 that actuates the actuator 64.

The inner regions of the plates 611, 621 are flush-coupled to the inner region 31 of the catalytic converter device 3 (FIG. 4). The outer regions of the plates 621, 622 are flush-coupled to the outer region 32 of the catalytic converter device 3 (FIG. 4). In a first working mode of the switching device 6, it is provided that the plates 61, 62 are adjusted so that the openings 63 of the inner regions of the plates 611, 621 at least partly overlap each other (FIG. 2). In this case said openings 63 overlap each other completely, (e.g., are disposed flush one above the other). At the same time, in this case the openings 63 of the outer regions of the plates 612, 622 do not overlap each other, so that they close each other. In this way, exhaust gas is deflected through the openings 63 of the inner regions 611, 621 of the switching device 6 and thus through the LNT 4 that is disposed in the inner region 31 of the first catalytic converter device 3 (FIG. 5).

In a second working mode of the switching device 6, it is provided that the plates 61, 62 are adjusted so that the openings 63 of the outer regions of the plates 612, 622 at least partly overlap (FIG. 3) each other. In this case said openings 63 overlap each other fully, i.e. are disposed flush one on the other. At the same time, in this case the openings 63 of the inner regions of the plates 611, 621 do not overlap each other, so that they close each other off. In this way, exhaust gas is deflected through the openings 63 of the outer regions 612, 622 of the switching device 6 and thus through the DOX 5 disposed in the outer region 32 of the first catalytic converter device 3 (FIG. 6).

It is also possible that the openings 63 of the inner regions 611, 621 and the outer regions 612, 622 overlap each other in a third working mode. In this case, exhaust gas would be passed through the LNT 4 and the DOX 5.

In an alternative embodiment, the switching device 6 comprises said openings, which can be separately actuated and correspondingly opened and closed. For this purpose, for example flaps that are connected to actuators can be provided on the openings.

A second catalytic converter device 8 is disposed downstream of the first catalytic converter device 3. A catalytic converter for selective reduction 9 (SCR) and a diesel particle filter 10 are disposed in the second catalytic converter device 8. The SCR 9 and the filter 10 can be disposed individually or combined with each other, for example in the form of an SCR coating of the filter 10.

A delivery device 11 for introducing a reducing agent into the exhaust system 2 is disposed upstream of the second catalytic converter device 8. The reducing agent is provided to reduce oxides of nitrogen in the SCR 9. An aqueous urea solution in particular (for example AdBlue®) is introduced into the exhaust system 2 as the reducing agent, which is hydrolyzed into water and ammonia. The urea solution can be introduced in liquid form or for example even injected if the delivery device 11 is embodied as a nozzle. Gaseous ammonia can also be introduced into the exhaust system 2.

To more uniformly distribute the introduced reducing agent, a mixer 12 is disposed in the vicinity of the delivery device 11 in the exhaust system 2. The mixer 12 comprises for example a plurality of vanes, on which the flow of exhaust gas impinges and in doing so causes turbulence in the introduced reducing agent in the exhaust system 2. The mixer 12 is disposed downstream of the delivery device 11 in the exhaust system 3.

At least one temperature sensor 13 is disposed upstream of the first catalytic converter device 3 in the exhaust system 2. A further temperature sensor 13 is disposed upstream of the second catalytic converter device 8. The temperature sensors 13 are connected to the control device 7, to which measurement values are transmitted. At least one throughflow sensor 14 is disposed in each of the LNT 4 and the DOX 5. The throughflow sensors 14 are each also connected to the control device 7, to which the measurement values are transmitted. Said sensors can be disposed at diverse points in the exhaust system 2, as can other sensors, for example pressure sensors, nitrogen oxide sensors and/or oxygen sensors.

Said another way, FIGS. 2 and 3 illustrate the switching device 6 (interchangeably referred to as flow device 6 or flow control device 6) comprising a first plate 61 and a second plate 62. Each of the first plate 61 and the second plate 62 comprise openings 63. The openings 63 may comprise a plurality of inner openings 222 and a plurality of outer openings 232. The plurality of inner openings 222 may be evenly distributed and spaced apart from one another such that sections of the first and second plates 61, 62 are arranged between each of the inner openings 222 and block exhaust gas flow. In one example, the sections and the inner openings 222 may be sized similarly such that a single section may obstruct and block a single inner opening of the inner openings 222, thereby blocking gas flow through the single inner opening. In one example, the sections between the plurality of inner openings 222 are radially interior sections and the sections between the plurality of outer openings 232 are radially outer and/or exterior sections.

The plurality of outer openings 232 may be evenly distributed and spaced apart from one another such that sections of the first and second plates 61, 62 are arranged between each of the outer openings 232 and block exhaust gas flow. In one example, the sections and the outer openings 232 may be sized similarly such that a single section may obstruct and block a single outer opening of the outer openings 232, thereby blocking gas flow through the single outer opening.

In this way, the first plate 61 comprises the inner openings 222 and the outer openings 232. Likewise, the second plate 62 comprises the inner openings 222 and the outer openings 232. The first plate 61 and the second plate 62 may be sized similarly such that the inner openings 222 or the outer openings 232 may align during some positions of the first or second plate 61, 62 such that exhaust gas may flow through the inner openings 222 or the outer openings 232.

In one example, the inner openings 222 and the outer openings 232 are arranged such that when the inner openings 222 of the first plate 61 and the second plate 62 are completely aligned, the outer openings 232 of the first plate 61 and the second plate 62 are completely misaligned. As such, the sections blocking exhaust flow of the first plate 61 and the second plate 62 are aligned with the outer openings 232 when the inner openings 222 are aligned. Conversely, when the outer openings 232 are completely aligned, the inner openings 222 are completely misaligned. When the inner openings 222 are completely aligned, exhaust gas may flow through the inner openings 222, without flowing through the outer openings 232, to the first inner region 31 (e.g., the LNT 4) of the first catalytic converter device 3. When the outer openings 232 are completely aligned, exhaust gas may flow through the outer openings 232, without flowing through the inner openings 222, to the second outer region 32 (e.g., the DOC 5) of the second catalytic converter device 3. As such, partial alignment of the inner openings 222 may also lead to partial alignment of the outer openings 232, resulting in exhaust gas flow to the first inner region 31 and the second outer region 32 of the second catalytic converter device 3.

In one example, one of the first plate 61 or the second plate 62 is fixed, while the other plate is actuatable (e.g., pivotable and/or rotatable) to adjust an alignment of the inner openings 222 and the outer openings 232. In one example, the first plate 61 is moveable and the second plate 62 is fixed. The switching device 6 may comprise a pair of end tabs 242 for limiting an actuation of adaptor 65. The adaptor may comprise a tab shape, wherein the adaptor is oriented in a direction perpendicular to the pair of end tabs 242. The adaptor 65 may be actuated between the pair of end tabs 242, wherein contact with a first end tab 242A may correspond to a first working position (FIG. 2) and contact with a second end tab 242B may correspond to a second working position (FIG. 3). As such, the adaptor 65 is moved some angular amount between the first working position shown in the example of FIG. 2 and the second working position shown in the example of FIG. 3. In some examples, the angular amount is less than 10 degrees. In some examples, additionally or alternatively, the angular amount is less than 8 degrees. In some examples, additionally or alternatively, the angular amount is less than 7 degrees. In some examples, additionally or alternatively, the angular amount is less than 5 degrees. In one example, the angular amount is less than 4 degrees.

In one embodiment of a method according to the disclosure for controlling exhaust gas aftertreatment according shown in FIG. 7 via a device according to FIG. 1, in a first step S1 the combustion engine is operated. In a second step S2, the exhaust gas temperature in the upstream region of the first catalytic converter device 3 is determined. In this case, values are measured by the temperature sensor 13 and transmitted to the control device 7. Alternatively, the temperatures can also be determined based on a model.

In a third step S3, the switching device 6 is switched into the first working mode if the exhaust gas temperature is less than or equal to a first threshold value for the temperature (FIG. 5). For this purpose, the control device 7 issues a corresponding control command to the actuator 64 of the switching device 6, which sets the openings in the inner region of the switching device 6 to pass flow. The switching device 6 is switched into the second working mode if the exhaust gas temperature is greater than the first threshold value (FIG. 6). For this purpose, the control device 7 issues a corresponding control command to the actuator of the switching device 6, which sets the openings in the outer region of the switching device 6 to pass flow. If the switching device 6 is already in the first working mode, it remains in the first working mode if the exhaust gas temperature is less than or equal to the first threshold value is. If the switching device 6 is already in the second working mode, it remains in the second working mode if the exhaust gas temperature is greater than the first threshold value.

In a fourth step S4, the velocity of the exhaust gas is determined. The velocity is for example determined in the volume of the LNT 4 if the switching device 6 is in the first working mode, or in the DOX 5 if the switching device 6 is in the second working mode. If the velocity of the exhaust gas is less than or equal to a threshold value, the switching device is switched into the first working mode in a fifth step S5 or is left in the first working mode if it is already in the first working mode. If the velocity of the exhaust gas is greater than said threshold value, the switching device 6 is switched into the second working mode or is left in the second working mode if it is already in the second working mode.

Turning now to FIG. 8, it shows a method 800 for adjusting a working position of the switching device. Instructions for carrying out the method may be executed by a controller and/or control device based on instructions stored on a memory of the controller and in conjunction with signals received from sensors of the engine system, such as the sensors described with reference to FIGS. 1 and 9. The controller may employ engine actuators of the engine system to adjust engine operation, according to the methods described below.

The method 800 begins at 802, which includes determining, estimating, and/or measuring current engine operating parameters. Current engine operating parameters may include but are not limited to one or more of manifold vacuum, throttle position, engine speed, engine load, engine temperature, vehicle speed, and air/fuel ratio.

The method 800 proceeds to 804, which may include determining if a first exhaust temperature is greater than a first threshold temperature. The first exhaust gas temperature may be measured and/or sensed via a temperature sensor arranged upstream of a first catalytic converter device (e.g., the first catalytic converter device 3 of FIG. 1). The first threshold temperature may be based on a desired operating temperature of the LNT. In one example, the first threshold temperature may be based on a desired operating temperature of an SCR device downstream of the LNT. In one example, the first threshold temperature is a non-zero positive number, such as 200° C. As described above, the LNT may be arranged along an inner region of the first catalytic converter device.

If the exhaust gas temperature is not less than the first threshold temperature, then the method 800 proceeds to 806 to enter a second working mode. The method 800 proceeds to 808, which includes rotating the flow device (e.g., the switching device 6 of FIGS. 1-6) a second direction so that an adaptor touches a second end tab. In this way, the outer openings of the flow device are aligned, and the inner openings are misaligned, such that exhaust gas may flow through only the outer openings without flowing through the inner openings. In some examples, if the flow device was previously in a position corresponding to the second working position, then the step 808 may be omitted. However, if the flow device was previously in a position corresponding to the first working position, then the step 808 is executed and a portion of the flow device is rotated to misalign the inner openings and align the outer openings.

The method 800 proceeds to 810, which includes flowing exhaust gas through an outer region of the first catalytic converter device, which corresponds to the DOC portion of the device. As such, exhaust gas may not flow through the LNT of the first catalytic converter device during the second working mode.

Returning to 804, if the exhaust temperature upstream of the first catalytic converter device is less than the first threshold temperature, then the method 800 proceeds to 812, which includes determining if a volumetric flow of exhaust gas to the first catalytic converter device is less than a threshold value. In one example, the threshold value may correspond to an amount of exhaust gas flow at lower engine loads. For example, lower engine loads may occur during city/urban driving or other driving conditions where vehicle speeds are relatively low and a stopping frequency is relatively high. As such, higher engine loads may occur during highway driving and/or during accelerations corresponding to hard tip-ins of an acceleration pedal.

If the volumetric exhaust gas flow to the first catalytic converter device is not less than the threshold value, then the method 800 proceeds to 806 as described above and enters the second working mode and flows exhaust gas through the outer region of the first catalytic converter device. Thus, the second working mode may correspond to a working mode where conditions are met for the SCR device arranged in a second catalytic converter device, downstream of the first catalytic converter device relative to a direction of exhaust gas flow, to reduce exhaust gases at a greater efficiency than the LNT of the first catalytic converter device. As such, exhaust gases are directed to the DOC in the outer region of the first catalytic converter device without flowing through the LNT.

Returning to 812, if the volumetric flow of the exhaust gas flowing to the first catalytic converter is less than the threshold value and its temperature was previously determined to be less than the first threshold temperature, then the method 800 proceeds to 814 to enter the first working mode. The method 800 proceeds to 816, which includes rotating the flow device (e.g., the switching device 6 of FIGS. 1-6) a first direction so that the adapter may contact a first tab end (e.g., first tab end 242A of FIGS. 2 and 3). In this way, the inner openings may be aligned and the outer openings may be misaligned, thereby blocking exhaust gas flow through the outer openings. If the flow device was previously in the first working position, then the step 816 may be omitted as the adaptor is already in contact with the first tab end. However, if the position of the flow device is the second working position prior to 816, then the flow device is rotated the first direction, opposite to the second direction, to enter the first working mode.

The method 800 proceeds to 818, which includes flowing exhaust gas through an inner region of the first catalytic converter device. Additionally or alternatively, the first working mode comprises flowing exhaust gas through the inner region without flowing exhaust gas through the outer region of the first catalytic converter device. In this way, exhaust gas flows through the aligned inner openings, without flowing through the misaligned outer openings, and enters the LNT arranged in the inner region of the first catalytic converter device.

The method 800 proceeds to 820 following 818 or 810, which includes flowing exhaust gas to the second catalytic converter device, which may be an SCR, arranged downstream of the first catalytic converter device relative to a direction of exhaust gas flow.

The method 800 proceeds to 822, which includes determining if the exhaust gas temperature of exhaust gas flowing to the second catalytic converter device is greater than or equal to a second threshold temperature. The exhaust gas temperature may be sensed downstream of the first catalytic converter device and upstream of the second catalytic converter device (e.g., the SCR). The second threshold temperature may be based on an exhaust gas temperature where reductant may be swept out of the second catalytic converter device. In one example, the second threshold temperature is greater than the first threshold temperature. As such, detecting the exhaust gas temperature being greater than or equal to the second threshold temperature may preemptively determine a reductant request.

If the exhaust gas temperature is greater than or equal to the second threshold temperature, then the method 800 proceeds to 824, which may include injecting a reducing agent into a portion of the exhaust passage between the first catalytic converter device and the second catalytic converter device. In this way, the reducing agent may be injected during either the first working mode or the second working mode. The injecting may be executed via an injector positioned to inject directly into the exhaust passage toward a surface of the second catalytic converter device. In some examples, additionally or alternatively, a mixing device may be arranged between the injector and the second catalytic converter device to promote even dispersion of the reductant across an entire surface of the second catalytic converter device.

If the exhaust gas temperature is not greater than or equal to the second threshold temperature, then the method 800 proceeds to 826, which includes not injecting the reducing agent into the exhaust passage toward the second catalytic converter device. This may conserve reductant stored in a reductant reservoir while exhaust gas temperatures are not hot enough to sweep reductant out of the second catalytic converter device.

Said another way, additionally or alternatively, the method 800 comprises during the operation of the combustion engine of a motor vehicle, exhaust gas-related operationally relevant operating parameters are detected, particularly the exhaust gas temperature and the velocity of the exhaust gas. The parameters are determined on a sensor basis or based on a model. If a first temperature value $T_1$ of the exhaust gas temperature detected upstream of the first catalytic converter device 3 is greater than a first threshold value of the temperature $T_{S1}$, the exhaust gas is passed through the DOX. If the exhaust gas temperature $T_1$ is less than or equal to a first threshold value for the temperature $T_{S1}$, the volumetric flow of exhaust gas $v_A$ is determined. If the volumetric flow of exhaust gas $v_A$ is greater than a threshold value for the volumetric flow of exhaust gas $v_{AS}$, the exhaust gas is passed through the DOX 5, even if the exhaust gas temperature $T_1$ is less than the first threshold value for the temperature $T_{S1}$. If the volumetric flow of exhaust gas $v_A$ is less than or equal to the threshold value for the volumetric flow of exhaust gas $v_{AS}$, the exhaust gas is passed through the LNT 4 if the exhaust gas temperature $T_1$ is also less than or equal to the first threshold value for the temperature $T_{S1}$.

After flowing through the LNT 4 and the DOX 5, the exhaust gas passes downstream to the SCR 9 or to the second catalytic converter device 8. Depending on the exhaust gas temperature, reducing agent is introduced into the exhaust system 2 by means of the delivery device 11. For this purpose, a second temperature value $T_2$ is determined in the vicinity of the SCR 9, for example directly upstream of the second catalytic converter device 8. If the exhaust gas temperature is greater than or equal to a second threshold value for the temperature $T_{S2}$, reducing agent is introduced. If the exhaust gas temperature $T_2$ is less than the second threshold value for the temperature $T_{S2}$, no reducing agent is introduced. The method is then continued with the detection of the first temperature $T_{S1}$ and comparison with the threshold values.

FIG. 9 shows a schematic depiction of a hybrid vehicle system 906 that can derive propulsion power from engine system 908 and/or an on-board energy storage device. An energy conversion device, such as a generator, may be operated to absorb energy from vehicle motion and/or engine operation, and then convert the absorbed energy to an energy form suitable for storage by the energy storage device.

Engine system 908 may include an engine 910 having a plurality of cylinders 930. Engine 910 includes an engine intake 923 and an engine exhaust 925. Engine intake 923 includes an air intake throttle 962 fluidly coupled to the engine intake manifold 944 via an intake passage 942. Air may enter intake passage 942 via air filter 952. Engine exhaust 925 includes an exhaust manifold 948 leading to an exhaust passage 935 that routes exhaust gas to the atmosphere. Engine exhaust 925 may include one or more emission control devices mounted in a close-coupled or far vehicle underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 908 is a boosted engine system, the engine system may further include a boosting device, such as a turbocharger (not shown).

In one example, the emission control device 970 is a first emission control device arranged upstream of a second emission control device 972 relative to a direction of exhaust gas flow. A volumetric sensor 974 may be arranged at a junction between the first emission control device 970 and a flow control device 976. Additionally or alternatively, a temperature sensor 128 may be arranged upstream of the first emission control device 970.

In one example, the first emission control device 970 may be used similarly to the first catalytic converter device 3 of FIG. 1. As such, in one example, the first emission control device 970 is a combination catalyst, which may comprise nitrogen oxide capturing abilities and oxidation catalyst functionality. More specifically, the first emission control device 970 may comprise an inner region 970A having LNT catalyst capabilities and an outer region 970B having oxidation catalyst capabilities. The inner region 970A may be fluidly separated from the outer region 970B such that exhaust gases in the outer region 970B do not mix with exhaust gases in the inner region 970A.

The flow control device 976, which may be used similarly to switching device 6 of FIG. 1, may be positioned directly upstream of the first emission control device 970. The flow control device 976 may be adjusted in response to feedback from one or more of the temperature sensor 128 and the volumetric sensor 974 as described above with respect to method 800. The flow control device 976 comprises an inner region 970A adjacent to a central axis 999 of the exhaust passage and an outer region 970B distal to the central axis 999. In one example, the inner region 970A and the outer region 970B are concentric with one another about the central axis 999. The inner region comprises a plurality of inner openings and the outer region comprises a plurality of outer openings. The inner and outer openings may be positioned to adjust flow to the inner region 970A or the outer region 970B. In one example, the outer openings are misaligned and positioned to block flow to the outer region 970B while the inner openings are aligned and positioned to promote exhaust flow to only the inner region 970A when the flow device 976 is in a first working position. Additionally or alternatively, the outer openings may be aligned and positioned to promote flow to the outer region 970B while the inner openings may be misaligned and positioned to block flow to the inner region 970A when the flow device 976 is in a second working position.

The second emission control device 972 may be a selective catalyst reduction (SCR) catalytic converter used similarly to the second catalytic converter device 8 of FIG. 1. A temperature sensor 127 may be arranged between the first emission control device 970 and the second emission control device 972. An injector 982, fluidly coupled to a reductant reservoir, may be arranged between the first emission control device 970 and the second emission control device 972. Operation of the injector 982 may be based on feedback from the temperature sensor 127, as described above with respect to method 800 of FIG. 8.

Vehicle system 906 may further include control system 914. Control system 914 is shown receiving information from a plurality of sensors 916 (various examples of which are described herein) and sending control signals to a plurality of actuators 981 (various examples of which are described herein). As one example, sensors 916 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 906. As another example, the actuators may include the throttle 962.

Controller 912 may be configured as a conventional microcomputer including a microprocessor unit, input/output ports, read-only memory, random access memory, keep alive memory, a controller area network (CAN) bus, etc. Controller 812 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Controller 912 may be used similarly to control unit 7 of FIG. 1.

In some examples, hybrid vehicle 906 comprises multiple sources of torque available to one or more vehicle wheels 959. In other examples, vehicle 906 is a conventional vehicle with only an engine, or an electric vehicle with only electric machine(s). In the example shown, vehicle 906 includes engine 910 and an electric machine 951. Electric machine 951 may be a motor or a motor/generator. A crankshaft of engine 910 and electric machine 951 may be connected via a transmission 954 to vehicle wheels 959 when one or more clutches 956 are engaged. In the depicted example, a first clutch 956 is provided between a crankshaft and the electric machine 951, and a second clutch 956 is provided between electric machine 951 and transmission 954. Controller 912 may send a signal to an actuator of each clutch 956 to engage or disengage the clutch, so as to connect or disconnect crankshaft from electric machine 951 and the components connected thereto, and/or connect or disconnect electric machine 951 from transmission 954 and the components connected thereto. Transmission 954 may be a gearbox, a planetary gear system, or another type of transmission. The powertrain may be configured in various manners including as a parallel, a series, or a series-parallel hybrid vehicle.

Electric machine 951 receives electrical power from a traction battery 961 to provide torque to vehicle wheels 959. Electric machine 951 may also be operated as a generator to provide electrical power to charge battery 961, for example during a braking operation.

Turning now to FIG. 10, it shows a graph 1000 graphically illustrating a prophetic engine operating sequence illustrating adjustments to the flow device and injector relative to one or more engine operating conditions. Plot 1010 illustrates a first exhaust gas temperature and dashed line 1012 illustrates a first threshold temperature. Plot 1020 illustrates an exhaust gas volumetric flow and dashed line 1022 illustrates a threshold value. Plot 1030 illustrates a working mode position of the flow device. Plot 1040 illustrates a location of exhaust gas flow. Plot 1050 illustrates a second exhaust gas temperature and dashed line 1052 illustrates a second temperature threshold. Plot 1060 illustrates a reductant injection. As described above, the first exhaust gas temperature may be sensed via the first exhaust gas sensor arranged upstream of the first catalytic converter device and the second exhaust gas temperature may be sensed via the second exhaust gas sensor arranged between the first catalytic converter and the second catalytic converter device. Time increases from a left to a right side of the figure.

Prior to t1, the first exhaust gas temperature (plot 1010) is less than the first threshold temperature (dashed line 1012). As such, the working mode (plot 1030) of the flow device is in a first working mode. The first working mode may align the inner openings of the flow device while misaligning the outer openings of the flow device so that exhaust gas may flow through only the inner openings. In one example, surfaces of plates of the flow device may block the outer openings while the outer openings are misaligned to block exhaust gas flow therethrough. In this way, exhaust gas flows along the inner region of the flow device adjacent to a central axis (e.g., central axis 999 of FIG. 9) of the exhaust passage. In this way, the LNT of the first catalytic converter device receives exhaust gas without flowing exhaust gas to the oxidation catalyst of the LNT. The first working mode is further selected based on the exhaust volumetric flow (plot 1020) being less than the threshold value (dashed line 1022). The second exhaust gas temperature (plot 1050) is less than the second threshold temperature (dashed line 1052). As such, the reductant injection is off. At t1, the first exhaust gas temperature, the exhaust volumetric flow, and the second exhaust gas temperature increase toward respective thresholds.

Between t1 and t2, the exhaust volumetric flow increases to a flow greater than the threshold value. At t2, the working mode is switched to the second working mode from the first working mode. As such, a plate of the flow device is at least partially rotated in a second direction to adjust an alignment of openings of the flow device. More specifically, by rotating to the second working position, the outer openings of the flow device may align while the inner openings of the flow device may misalign. As such, the outer openings may be positioned to flow exhaust gas to the outer regions of the exhaust passage in the second working position.

Between t2 and t3, the first exhaust gas temperature and the second exhaust gas temperature continue to increase. The second exhaust gas temperature remains below the second threshold temperature and as a result, the reductant injection is maintained off. The first exhaust gas temperature increases to a temperature greater than the first threshold temperature. As such, even if the volumetric exhaust flow decreased to a value less than the threshold value, the flow device would be maintained in the second working position and exhaust gas would continue to flow to only the oxidation catalyst of the first catalytic converter device without flowing to the LNT of the first catalytic converter device.

At t3, the second exhaust temperature increases to a temperature greater than the second threshold temperature. As such, the reductant injection is activated. After t3, the reductant injection continues as the flow device is maintained in the second working position. It will be appreciated that if the first exhaust gas temperature decreased to a temperature less than the first threshold temperature and the exhaust volumetric flow decreased to a value less than the threshold value, then the flow device may be adjusted to the first working position In this way, a flow control device may adjust exhaust gas flow to a first catalytic converter in response to an exhaust gas temperature upstream of the first catalytic converter and/or a volumetric flow of exhaust gas to the first catalytic converter. The first catalytic converter may comprise a first catalyst arranged along an inner radial region adjacent to a central axis of an exhaust passage. The first catalytic converter may further comprise a second catalytic concentric with and surrounding the first catalyst relative to the central axis. The flow device may comprise inner openings shaped to flow exhaust gas to only the first catalyst and outer openings shaped to flow exhaust gas to only the second catalyst. The flow device may be rotated to block one of the inner or outer openings, so that only one of the first catalyst or the second catalyst may receive exhaust gas. The technical effect of arranging the flow device upstream of the first catalytic converter to adjust exhaust flow to different radial regions of the converter is to increase exhaust gas treatment efficiency. The second catalyst of the first catalytic converter may be configured to increase a $NO_x$ to $NO_2$ ratio so that a second catalytic converter, downstream of the first catalytic converter, comprising SCR properties, may more efficiently treat nitrogen containing compound emissions at higher exhaust gas temperatures relative to the first catalyst. By doing this, emissions may be reduced.

In another representation, an arrangement of a combustion engine with an exhaust system, in which at least one oxidation catalytic converter and at least one first nitrogen oxide storage catalytic converter are disposed in a common first catalytic converter device, downstream of which at least one first catalytic converter for selective catalytic reduction and at least one particle filter are disposed and at least one delivery device for a reducing agent is disposed upstream of the catalytic converter for selective catalytic reduction, in which the first catalytic converter device comprises a first, inner region and a second, outer region, and in which a switching device for controlling the flow of exhaust gas is disposed at the upstream end, which is embodied to pass exhaust gas through the inner region in a first working mode and to pass exhaust gas through the outer region in a second working mode.

A first example of the arrangement further includes where the oxidation catalytic converter is disposed in the outer region of the first catalytic converter device.

A second example of the arrangement optionally including the first example further includes where the nitrogen oxide storage catalytic converter is disposed in the inner region of the first catalytic converter device.

A third example of the arrangement including any of the examples above further includes where the catalytic converter for selective catalytic reduction and the particle filter are disposed in a common second catalytic converter device.

A fourth example of the arrangement including any of the examples above further includes where a mixer for fluid media is disposed in the exhaust system upstream of the catalytic converter for selective catalytic reduction.

A fifth example of the arrangement including any of the examples above further includes where the oxidation catalytic converter is optimized for a high conversion efficiency from nitrogen monoxide to nitrogen dioxide.

A hybrid motor vehicle with an arrangement of any of the claims above.

A method for controlling exhaust gas aftertreatment with an arrangement as claimed in any of the claims above comprises operating the combustion engine, determining a first exhaust gas temperature in the region upstream of the first catalytic converter device, switching the switching device into the first working mode if the first exhaust gas temperature is less than or equal to a first threshold value for the temperature and into the second working mode if the first exhaust gas temperature is greater than the first threshold value, determining the velocity of the exhaust gas in the vicinity of the first catalytic converter device, leaving the switching device in the first working mode if the velocity is less than or equal to a threshold value for the velocity and switching into the second working mode if the velocity is greater than said threshold value.

A first example of the method further includes where a second exhaust gas temperature is determined in the vicinity of the catalytic converter for selective catalytic reduction and reducing agent is introduced into the exhaust system via the delivery device if the second exhaust gas temperature is greater than or equal to a second threshold value for the temperature and no reducing agent is introduced into the exhaust system if the second exhaust gas temperature is less than a second threshold value for the temperature.

A second example of the method, optionally including the first example, further includes where a ratio of nitrogen dioxide to nitrogen monoxide of 50% is desired when the switching device is switched into the second working mode.

A third example of the method optionally including any of the examples above further includes where the switching device is switched into the first or second working mode additionally depending on the operating point of the combustion engine.

A fourth example of the method optionally including any of the examples above further includes where the switching device is switched into the first or second working mode additionally depending on a combination of different parameters in the sense of a 3D-mapping in the control the combustion engine.

An embodiment of a system comprises a flow device shaped to flow exhaust gas to an outer region or an inner region of an emission control device, wherein the flow device comprises a rotatable first plate and a fixed second plate, each of the first plate and the second plate comprising inner and outer openings, wherein an alignment of the inner and outer openings is adjusted via a rotation of the first plate. A first example of the system, further includes where outer openings are misaligned and the inner openings are aligned in a first working position of the flow device, wherein the outer openings are blocked from flowing exhaust gas therethrough. A second example of the system, optionally including the first example, further includes where the inner openings are misaligned and the outer openings are aligned in a second working position of the flow device, wherein the inner openings are blocked from flowing exhaust gas therethrough. A third example of the system, optionally including the first and/or second examples, further includes where the emission control device comprises a lean $NO_x$ trap fluidly coupled to the inner openings and an oxidation catalyst fluidly coupled to the outer openings, and where the lean $NO_x$ trap is fluidly separated from the oxidation catalyst. A fourth example of the system, optionally including one or more of the first through third examples, further includes where the oxidation catalyst is radially outside of and surrounds the lean $NO_x$ trap, wherein the oxidation catalyst and the lean $NO_x$ trap are concentric about a central axis of an exhaust passage. A fifth example of the system, optionally including one or more of the first through fourth examples, further includes where a temperature sensor and a volumetric flow sensor arranged upstream of the emission control device, wherein the flow device is adjusted in response to a comparison of a temperature sensed by the temperature sensor to a threshold temperature and a comparison of a volumetric exhaust gas flow sensed by the volumetric flow sensor relative to a threshold value.

An embodiment of an engine system comprises an engine fluidly coupled to an exhaust passage, a flow device arranged along the exhaust passage comprising a first plate and a second plate, wherein one of the first plate or the second plate is rotatable between first and second positions, the first position aligning inner openings and misaligning outer openings of the first and second plates to flow exhaust gas along a central axis of the exhaust passage, the second position aligning outer openings and misaligning inner openings of the first and second plates to flow exhaust gas away from the central axis of the exhaust passage, a catalytic converter device comprising an LNT arranged along an inner region of the catalytic converter device and an oxidation catalyst arranged along an outer region of the catalytic converter device, wherein only the LNT receives exhaust gas when the flow device is in the first position and only the oxidation catalyst receives exhaust gas when the flow device is in the second position, a temperature sensor arranged upstream of the catalytic converter configured to sense a temperature of exhaust gas, a volumetric sensor arranged upstream of the catalytic converter configured to sense a volumetric flow of exhaust gas, and a controller with computer-readable instructions stored on non-transitory memory thereof that when executed enable the controller to rotate one of the first or second plates to the first position in response to the temperature of exhaust gas being less than a threshold temperature and the volumetric flow of exhaust gas being less than a threshold value and rotate one of the first or second plates to the second position in response to one of the temperature of exhaust gas being greater than or equal to the threshold temperature or the volumetric flow of exhaust gas being greater than or equal to the threshold value. A first example of the engine system further includes where the first plate is identical to the second plate in size and shape. A second example of the engine system, optionally including the first example, further includes where the first plate comprises a plurality of first plate inner openings and a plurality of first plate outer openings, the plurality of first plate outer openings arranged radially outside of the plurality of first plate inner openings, wherein the plurality of first plate inner openings are spaced apart from one another via radially interior surfaces of the first plate, and where the plurality of first plate outer openings are spaced apart from one another via radially outer surfaces of the first plate. A third example of the engine system, optionally including the first and/or second examples, further includes where the second plate comprises a plurality of second plate inner openings and a plurality of second plate outer openings, the plurality of second plate outer openings arranged radially outside of the plurality of second plate inner openings, wherein the plurality of second plate inner openings are spaced apart from one another via radially interior surfaces of the second plate, and where the plurality of second plate outer openings are spaced apart from one another via radially outer surfaces of the second plate. A fourth example of the engine system, optionally including one or more of the first through third examples, further includes where the plurality of first plate inner openings are aligned with the plurality of second plate inner openings in the first position, wherein the first position further comprises the plurality of first plate outer openings being misaligned with the plurality of second plate outer openings, the plurality of first plate outer openings blocked by radially outer surfaces of the second plate and the plurality of second plate outer openings blocked by radially outer surfaces of the first plate. A fifth example of the engine system, optionally including one or more of the first through fourth examples, further includes where the plurality of first plate outer openings are aligned with the plurality of second plate outer openings in the second position, wherein the second position further comprises the plurality of first plate inner openings being misaligned with the plurality of second plate inner openings, the plurality of first plate inner openings being blocked by radially interior surfaces of the second plate and the plurality of second plate inner openings being blocked by radially interior surfaces of the first plate. A sixth example of the engine system, optionally including one or more of the first through fifth examples, further includes where the first position comprises flowing exhaust gas to only the LNT of the catalytic converter without flowing exhaust gas to the oxidation catalyst of the catalytic converter, wherein the second position comprises flowing exhaust gas to only the oxidation catalyst of the catalytic converter without flowing exhaust gas to the LNT of the catalytic converter. A seventh example of the engine system, optionally including one or more of the first through sixth examples, further includes where the catalytic converter is a first catalytic converter arranged upstream of a second catalytic converter comprising a selective reduction catalyst relative to a direction of exhaust gas flow, further comprising an injector positioned to inject directly into a portion of the exhaust passage between the first catalytic converter and the second catalytic converter. An eighth example of the engine system, optionally including one or more of the first through seventh examples, further includes where the temperature sensor is a first temperature sensor, further comprising a second temperature sensor arranged between the first catalytic converter and the second catalytic converter, wherein the temperature sensed by the first temperature sensor is compared to a first threshold temperature and a temperature sensed by the second temperature sensor is compared to a second threshold temperature, wherein the injector injects in response to the temperature sensed by the second temperature sensor being greater than the second threshold temperature.

An embodiment of a method comprises rotating a first plate relative to a fixed second plate of a flow device arranged upstream of a first catalytic converter device to a first working position in response to a first exhaust gas temperature being less than a first threshold temperature or a volumetric exhaust gas value being less than a threshold value, rotating the first plate to a second working position in response to the first exhaust gas temperature being greater than or equal to the first threshold temperature or the volumetric exhaust gas value being greater than or equal to the threshold value and injecting reductant via an injector positioned to inject into a portion of an exhaust passage downstream of the first catalytic converter device and upstream of a second catalytic converter device in response to a second exhaust gas temperature being greater than or equal to a second threshold temperature. A first example of the method further includes where the first working position comprises flowing exhaust gas adjacent to a central axis of an exhaust passage in which the flow device, the first catalytic converter device, and the second catalytic converter device are arranged, and where flowing exhaust gas adjacent to the central axis further includes flowing exhaust gas to only a lean NO$_x$ trap of the first catalytic converter device without flowing exhaust gas to an oxidation catalyst of the first catalytic converter device. A second example of the method, optionally including the first example, further includes where the second working position further comprises flowing exhaust gas distal to the central axis of the exhaust passage, wherein flowing exhaust gas distal to the central axis further includes flowing exhaust gas to only the oxidation catalyst without flowing exhaust gas to the lean NO$_x$ trap of the first catalytic converter device. A third example of the method, optionally including the first and/or second examples, further includes where rotating the first plate relative to the second plate to the first working position comprises rotating the first plate in a first direction until an adaptor of the first plate touches a first end tab, and where outer openings of the first and second plates are misaligned and sealed and inner openings are aligned and positioned to flow exhaust gases therethrough. A fourth example of the method, optionally including one or more of the first through third examples, further includes where rotating the first plate relative to the second plate to the second working position comprises rotating the first plate in a second direction, opposite the first direction, until the adaptor of the first plate touches a second end tab, and where the inner openings of the first and second plates are misaligned and sealed and outer openings are aligned and positioned to flow exhaust gases therethrough.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a flow device shaped to flow exhaust gas to an outer region or an inner region of an emission control device, wherein the flow device comprises a rotatable first plate and a fixed second plate, each of the first plate and the second plate comprising inner and outer openings, wherein an alignment of the inner and outer openings is adjusted via a rotation of the first plate;
a temperature sensor and a volumetric flow sensor arranged upstream of the emission control device; and
a controller with computer-readable instructions stored on non-transitory memory thereof that when executed enable the controller to:
adjust the flow device in response to a comparison of a temperature sensed by the temperature sensor to a threshold temperature and a comparison of a volumetric exhaust gas flow sensed by the volumetric flow sensor relative to a threshold value.

2. The system of claim 1, wherein the outer openings are misaligned and the inner openings are aligned in a first working position of the flow device, wherein the outer openings are blocked from flowing exhaust gas therethrough.

3. The system of claim 2, wherein the inner openings are misaligned and the outer openings are aligned in a second working position of the flow device, wherein the inner openings are blocked from flowing exhaust gas therethrough.

4. The system of claim 1, wherein the emission control device comprises a lean NO$_x$ trap fluidly coupled to the inner openings and an oxidation catalyst fluidly coupled to the outer openings, and where the lean NO$_x$ trap is fluidly separated from the oxidation catalyst.

5. The system of claim 4, wherein the oxidation catalyst is radially outside of and surrounds the lean NO$_x$ trap, wherein the oxidation catalyst and the lean NO$_x$ trap are concentric about a central axis of an exhaust passage.

6. A engine system comprising:
an engine fluidly coupled to an exhaust passage;
a flow device arranged along the exhaust passage comprising a first plate and a second plate, wherein one of the first plate or the second plate is rotatable between first and second positions, the first position aligning inner openings and misaligning outer openings of the first and second plates to flow exhaust gas along a central axis of the exhaust passage, the second position aligning outer openings and misaligning inner openings of the first and second plates to flow exhaust gas away from the central axis of the exhaust passage;
a catalytic converter device comprising an LNT arranged along an inner region of the catalytic converter device and an oxidation catalyst arranged along an outer region of the catalytic converter device, wherein only the LNT receives exhaust gas when the flow device is in the first position and only the oxidation catalyst receives exhaust gas when the flow device is in the second position;
a temperature sensor arranged upstream of the catalytic converter configured to sense a temperature of exhaust gas;
a volumetric sensor arranged upstream of the catalytic converter configured to sense a volumetric flow of exhaust gas; and
a controller with computer-readable instructions stored on non-transitory memory thereof that when executed enable the controller to:
rotate one of the first or second plates to the first position in response to the temperature of exhaust gas being less than a threshold temperature and the volumetric flow of exhaust gas being less than a threshold value; and
rotate one of the first or second plates to the second position in response to one of the temperature of exhaust gas being greater than or equal to the threshold temperature or the volumetric flow of exhaust gas being greater than or equal to the threshold value.

7. The engine system of claim 6, wherein the first plate is identical to the second plate in size and shape.

8. The engine system of claim 6, wherein the first plate comprises a plurality of first plate inner openings and a plurality of first plate outer openings, the plurality of first plate outer openings arranged radially outside of the plurality of first plate inner openings, wherein the plurality of first plate inner openings are spaced apart from one another via radially interior surfaces of the first plate, and where the plurality of first plate outer openings are spaced apart from one another via radially outer surfaces of the first plate.

9. The engine system of claim 8, wherein the second plate comprises a plurality of second plate inner openings and a plurality of second plate outer openings, the plurality of second plate outer openings arranged radially outside of the plurality of second plate inner openings, wherein the plurality of second plate inner openings are spaced apart from one another via radially interior surfaces of the second plate, and where the plurality of second plate outer openings are spaced apart from one another via radially outer surfaces of the second plate.

10. The engine system of claim 9, wherein the plurality of first plate inner openings are aligned with the plurality of second plate inner openings in the first position, wherein the first position further comprises the plurality of first plate outer openings being misaligned with the plurality of second plate outer openings, the plurality of first plate outer openings blocked by radially outer surfaces of the second plate and the plurality of second plate outer openings blocked by radially outer surfaces of the first plate.

11. The engine system of claim 9, wherein the plurality of first plate outer openings are aligned with the plurality of second plate outer openings in the second position, wherein the second position further comprises the plurality of first plate inner openings being misaligned with the plurality of second plate inner openings, the plurality of first plate inner openings being blocked by radially interior surfaces of the second plate and the plurality of second plate inner openings being blocked by radially interior surfaces of the first plate.

12. The engine system of claim 6, wherein the first position comprises flowing exhaust gas to only the LNT of the catalytic converter without flowing exhaust gas to the oxidation catalyst of the catalytic converter, wherein the second position comprises flowing exhaust gas to only the oxidation catalyst of the catalytic converter without flowing exhaust gas to the LNT of the catalytic converter.

13. The engine system of claim 6, wherein the catalytic converter is a first catalytic converter arranged upstream of a second catalytic converter comprising a selective reduction catalyst relative to a direction of exhaust gas flow, further comprising an injector positioned to inject directly into a portion of the exhaust passage between the first catalytic converter and the second catalytic converter.

14. The engine system of claim 13, wherein the temperature sensor is a first temperature sensor, further comprising a second temperature sensor arranged between the first catalytic converter and the second catalytic converter, wherein the temperature sensed by the first temperature sensor is compared to a first threshold temperature and a temperature sensed by the second temperature sensor is compared to a second threshold temperature, wherein the injector injects in response to the temperature sensed by the second temperature sensor being greater than the second threshold temperature.

15. A method comprising:
via a controller with computer-readable instructions stored on non-transitory memory thereof:
rotating a first plate relative to a fixed second plate of a flow device arranged upstream of a first catalytic converter device to a first working position in response to a first exhaust gas temperature being less than a first threshold temperature or a volumetric exhaust gas value being less than a threshold value;
rotating the first plate to a second working position in response to the first exhaust gas temperature being greater than or equal to the first threshold temperature or the volumetric exhaust gas value being greater than or equal to the threshold value; and
injecting reductant via an injector positioned to inject into a portion of an exhaust passage downstream of the first catalytic converter device and upstream of a second catalytic converter device in response to a second exhaust gas temperature being greater than or equal to a second threshold temperature.

16. The method of claim 15, wherein the first working position comprises flowing exhaust gas adjacent to a central axis of an exhaust passage in which the flow device, the first catalytic converter device, and the second catalytic converter device are arranged, and where flowing exhaust gas adjacent to the central axis further includes flowing exhaust gas to only a lean $NO_x$ trap of the first catalytic converter device without flowing exhaust gas to an oxidation catalyst of the first catalytic converter device.

17. The method of claim 16, wherein the second working position further comprises flowing exhaust gas distal to the central axis of the exhaust passage, wherein flowing exhaust gas distal to the central axis further includes flowing exhaust gas to only the oxidation catalyst without flowing exhaust gas to the lean $NO_x$ trap of the first catalytic converter device.

18. The method of claim 15, wherein rotating the first plate relative to the second plate to the first working position comprises rotating the first plate in a first direction until an adaptor of the first plate touches a first end tab, and where outer openings of the first and second plates are misaligned and sealed and inner openings are aligned and positioned to flow exhaust gases therethrough.

19. The method of claim 18, wherein rotating the first plate relative to the second plate to the second working position comprises rotating the first plate in a second direction, opposite the first direction, until the adaptor of the first plate touches a second end tab, and where the inner openings of the first and second plates are misaligned and sealed and outer openings are aligned and positioned to flow exhaust gases therethrough.

* * * * *